United States Patent [19]

Valyi

[11] 3,955,697

[45] May 11, 1976

[54] MULTILAYERED HOLLOW PLASTIC CONTAINER

[76] Inventor: Emery I. Valyi, 5200 Sycamore Ave., Riverdale, N.Y. 10471

[22] Filed: Jan. 6, 1975

[21] Appl. No.: 538,894

Related U.S. Application Data

[63] Continuation of Ser. No. 309,346, Nov. 24, 1972, abandoned, Continuation-in-part of Ser. Nos. 71,734, Sept. 14, 1970, Pat. No. 3,717,544, and Ser. No. 100,050, Dec. 21, 1971, Pat. No. 3,719,735.

[52] U.S. Cl. ............................ 215/1 C; 428/35; 428/412; 428/474; 428/518; 428/515; 428/520; 264/89; 220/63 R
[51] Int. Cl.² ................ B65D 23/00; B65D 23/02
[58] Field of Search ............... 161/183; 220/63 R; 264/89; 428/35, 412, 474, 518, 515, 520; 215/1 C

[56] References Cited
UNITED STATES PATENTS

| | | |
|---|---|---|
| 3,420,729 | 1/1969 | Roberts ........................... 161/183 X |
| 3,496,258 | 2/1970 | Wiley ................................ 264/89 |
| 3,526,572 | 9/1970 | Finelli ............................... 161/183 |
| 3,547,747 | 12/1970 | Roberts ......................... 161/183 X |
| 3,606,958 | 9/1971 | Coffman ........................ 161/183 X |
| 3,726,953 | 4/1973 | Jones et al. ........................ 264/89 |

Primary Examiner—William J. Van Balen
Assistant Examiner—Patricia C. Ives
Attorney, Agent, or Firm—Robert H. Bachman

[57] ABSTRACT

A multilayered, hollow plastic container having resistance to elevated temperatures and barrier resistance, and a method for providing same. The container has an outer first portion of a material resistant to temperatures in excess of 175° F., an inner second portion of a material resistant to temperatures in excess of 175° F. and a third portion barrier layer of a thermoplastic material between said first and second portions. Also, a multilayered plastic sheet material having resistance to elevated temperatures and barrier resistance.

6 Claims, 8 Drawing Figures

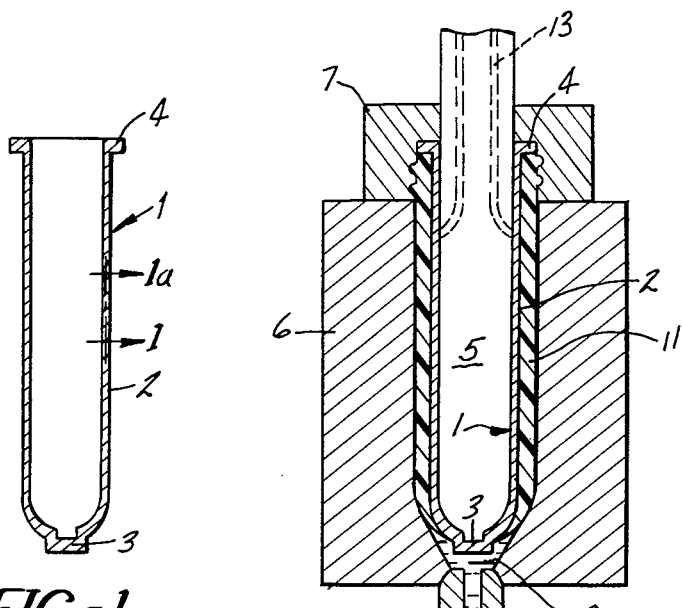
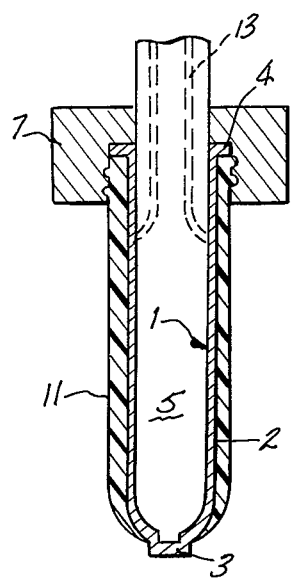
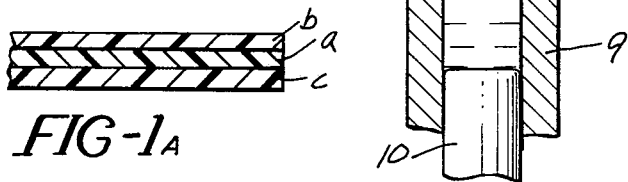
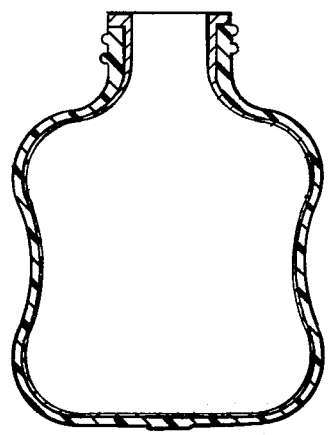
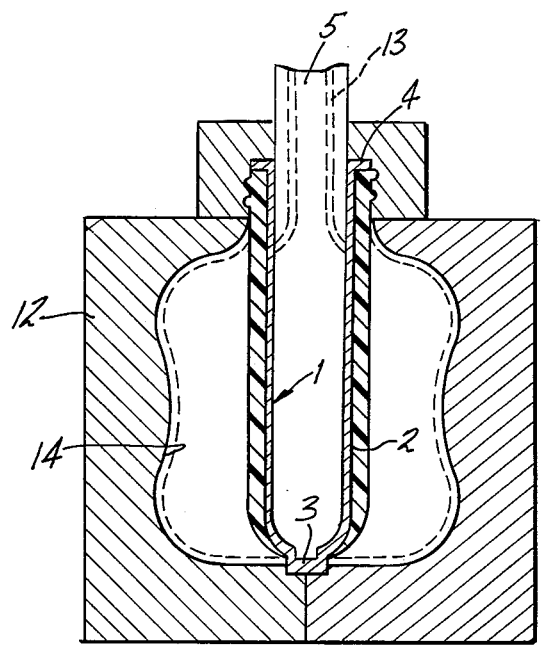
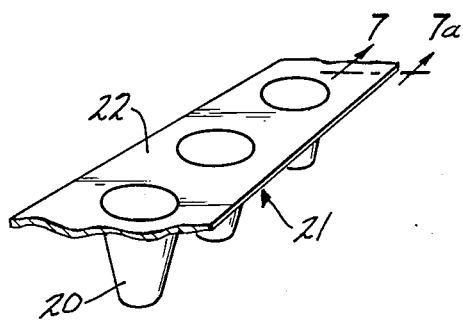
FIG-1  FIG-2  FIG-3
FIG-1A
FIG-5  FIG-4
FIG-6  FIG-7

MULTILAYERED HOLLOW PLASTIC CONTAINER

CROSS REFERENCE TO RELATED APPLICATIONS

This application is a continuation of application Ser. No. 309,346, filed Nov. 24, 1972, now abandoned, which in turn is a continuation-in-part of copending application Ser. No. 71,734 for "Method and Apparatus for Making Lined Plastic Containers" filed Sept. 14, 1970 by Emery I. Valyi, now U.S. Pat. No. 3,717,544 and copending application Ser. No. 100,050 for "Method for Molding Plastic Containers" filed Dec. 21, 1971 by Emery I. Valyi, now U.S. Pat. No. 3,719,735.

BACKGROUND OF THE INVENTION

This invention relates to multilayered material, especially containers having properties which are not obtainable in a single layered product.

Multilayered plastic containers are highly desirable whenever it is difficult to satisfy all of the requirements and specifications by using a single plastic.

For example, the low cost, easy formability, impact resistance and other desirable properties of polystyrene, polyvinyl chloride and polyolefins, especially polyethylene, would make them highly desirable containers for many commodities; however, for example, polyethylene does not have sufficient barrier or solvent resistance for many applications.

In instances of this kind, it has been attempted to provide a lined container, wherein the container wall is composed of more than one substance and thereby provide properties that no single plastic possesses.

However, heretofore the economical production of such containers was prohibitively difficult. In addition, certain combinations of properties presented considerable difficulties even in a composite container.

For example, it is highly desirable to obtain a plastic container having resistance to exposure to elevated temperatures, such as above 175° F. and preferably above 220° F., while at the same time having fluid barrier resistance, such as gas barrier resistance as resistance to the transmission of oxygen and carbon dioxide, or solvent resistance. In the production of composite containers of this type, however, it is known that when the container is exposed to elevated temperature conditions, as, for example, when filling with substances at such temperatures, the barrier material tends to melt, destroying the integrity and utility of the container.

Accordingly, it is a principal object of the present invention to provide a multilayered plastic, especially a hollow plastic container.

It is a particular object of the present invention to provide a plastic sheet material and container as aforesaid having resistance to elevated temperatures and barrier resistance.

It is an additional object of the present invention to provide a container as aforesaid wherein said container retains fluid barrier resistance upon repeated exposure to elevated temperatures.

It is a still further object of the present invention to provide a container as aforesaid which can be simply and conveniently prepared in accordance with the present invention.

Further objects and advantages of the present invention will appear hereinbelow.

SUMMARY OF THE INVENTION

The present invention provides a multilayered hollow plastic container having resistance to elevated temperatures and barrier resistance having an outer first portion of a material resistant to temperatures in excess of 175° F., preferably 220° F., and an inner second portion of a material resistant to temperatures in excess of 175° F., preferably 220° F., wherein said container has a third portion barrier layer of a thermoplastic material between said first and second portions. Preferably, there is provided an inner fourth portion of a material resistant to temperatures in excess of 175° F. between said first portion and third portion.

The container of the present invention achieves a great many highly desirable advantages. Thus, the instant container has resistance to elevated temperatures and also has barrier resistance, particularly fluid barrier resistance, such as gas barrier resistance, which barrier resistance is retained upon repeated exposure to elevated temperature.

The present invention also provides a multilayered plastic sheet material having the same highly desirable characteristics, said sheet material having a first component of a material resistant to temperatures in excess of 175° F., a second component of a material resistant to temperatures in excess of 175° F. and a third component barrier layer of thermoplastic material between said first and second components and substantially coextensive therewith, with all of said components being adhered to each other substantially over their entire contacting areas, similar to said container.

The principle of the present invention resides in the entrapment of the barrier layer between two layers of heat resistant plastic so that the barrier layer progressively softens, or perhaps melts, and reforms in place upon exposure to elevated temperature and subsequent cooling to ambient temperatures.

For example, a heat resistant container could be readily formed of material, such as polycarbonate, polypropylene, a phenoxy resin or a polysulfone. Similarly, a barrier plastic liner can be provided in accordance with the aforesaid copending applications utilizing, for example, polyvinylidene chloride, polyvinyl acetate, Barex (an acrylonitrile - styrene copolymer), or Lopak (a methacrylonitrile polymer); however, the barrier materials have softening or melting points well below the temperatures that the containers are called on to resist. This obviously leads to an entirely unsatisfactory situation.

In accordance with the present invention, the liner is prepared from a laminate or sandwich so that in the resultant container the barrier layer is entrapped between two layers of a heat resistant plastic. In use, when the container of the present invention is exposed to elevated temperatures, the low melting layer entrapped between the heat resistant layers may, and probably will, soften, if not melt, depending of course upon the use temperature. However, since the low melting layer is entrapped and in substantial conformity with the adjoining protective layers, it lacks mobility and must remain in place. Thus, upon cooling, the lower melting layer will be restored to its normal condition without change. For example, the lower melting layer cannot shrink and thereby produce voids, tear away, agglomerate or otherwise deform, except as it is forced to by the protective outer layers. Similarly, since the lower melting component is a thermoplastic material, its properties will not change upon repeated softening or melting or cooling.

BRIEF DESCRIPTION OF DRAWINGS

The present invention will be more readily understood from a consideration of the accompanying drawings in which:

FIG. 1 is a longitudinal section of a multilayered sleeve adapted to surround a blow core;

FIG. 1a is an exaggerated sectional view taken along the line 1 — 1a of FIG. 1 showing the components of the multilayered sleeve, or alternatively the components of the plastic sheet of the present invention;

FIG. 2 is a longitudinal section with parts in elevation of a parison mold showing the blow core covered by a sleeve;

FIG. 3 is a similar view showing the blow core retracted from the parison mold with the parison thereon;

FIG. 4 is a similar view showing the blow core in blow position within the blow mold and the hollow article of the present invention in the blow mold cavity;

FIG. 5 shows the multilayered, hollow plastic container of the present invention;

FIG. 6 is a partial elevation showing an alternate embodiment of preformed liners; and FIG. 7 is an exaggerated sectional view taken on line 7 — 7a of FIG. 6 showing a multi-layered web having two (2) layers.

DETAILED DESCRIPTION

Referring to the drawings in detail, FIG. 1 shows a preformed, multilayered sleeve 1 for the blow core to be used in the subsequent molding operation in forming the container of the present invention, said sleeve having an inner surface closely approximating the outer surface of that of the blow core. The thickness of the sleeve may vary depending for example on the materials used and final article desired; thus, side walls 2 may be thin, such as between 0.001 and 0.020 inch, while its bottom 3 may be twice to ten times as thick as the side walls and have a shape adapted to provide alignment with the parison mold. The rim 4 of the sleeve may conform to the top region of the container to be made. As indicated hereinabove, such sleeves should be multilayered, as shown in FIG. 1a wherein the central layer a is the barrier layer, such as polyvinylidene chloride, polyvinyl acetate, or acrylonitrile polymers or methacrylonitrile polymers. The outer layers in FIG. 1a, layers b and c, may be any heat resistant plastic, preferably a thermoplastic, such as polycarbonate polypropylene or copolymers thereof. Naturally, the outer layers may be the same or different, as desired. Such sleeves may be produced from a variety of plastics at reasonable cost, by methods well known in the art, such as for example by thermoforming, powder coating, casting, these methods being described on pages 534, 594, and 602, respectively, of the 1969–1970 Modern Plastics Encyclopedia, published by McGraw-Hill, Inc.; and by other methods well known in the art of manufacturing thin-walled, shaped articles of plastic.

The sleeves shown in FIG. 1 are used in a parison mold according to FIG. 2 which consists of blow core 5 and a parison mold 6 and a tool for the forming of the open end of the hollow article, the neck ring 7. A passage 8 connects the parison mold 6 with a supply of hot plastic contained within cylinder 9 from which the molten plastic may be pressed into parison mold 6 by piston 10 under sufficient pressure to effect rapid filling of the space between the blow core 5 and parison mold 6 and the space within neck ring 7 communicating with the parison mold.

The parison 11 molded in the apparatus shown in FIG. 2 may be removed from the parison mold 6 together with the blow core 5 and the neck ring 7, as shown in FIG. 3 and inserted into a blow mold 12. Pressure fluid obtained from a source not shown may be admitted through fluid passages 13 to the interior of parison 11. The blow mold 12 has a mold cavity 14 corresponding to the shape of the hollow article to be made and it may be made of two halves which are separable to facilitate the removal of the finished article to be made therein.

The above indicated movements of the blow core may for example be carried out by apparatus shown in U.S. Pat. Nos. 2,298,716; 3,100,913; 3,183,551; and in my U.S. Pat. No. 3,029,468. In any such apparatus, one or more blow cores may be used simultaneously and they may be moved from one operating position to another individually or in groups of several blow cores.

In the operation of this method, sleeves according to FIG. 1 may be produced by any designed method independently of the injection blow molding operation here described. Alternatively, sleeves may be fashioned in place, as for example by laminating the plastic layers and wrapping the laminated plastic film stock tightly around the blow core 5. The sleeve material must have deformation characteristics that equal or exceed those of the parison material, at the temperature normally maintained for expanding the parison into the blow mold cavity 14. Hence, it is preferred that the outer first portion be chosen to be the same plastic material as the inner second portion.

If a three-layered sleeve is employed, it may be desirable to treat the sleeve in order to insure adherance of the sleeve to the parison at the temperature normally used for injection molding. For example, the outside surface of the sleeve 1 that is to come into contact with the injected plastic of the parison 11 may be treated by procedures that are known in the art to promote the adhesion of plastic surfaces. For example, if the sleeve is to be made of polypropylene, its outside surface may be flame treated. In any event, the sleeve has to be compatible with the material of the parison and not interfere with the function of the ultimate hollow container.

The sleeve 1 which fits snugly over the blow core 5 is placed thereover by hand, or by mechanical means, not shown, before the blow core is inserted into the parison mold 6. When in place within the parison mold, the tip of the blow core, surrounded by bottom 3 of the sleeve may be held firmly against the inner wall of the parison mold, whenever it is desired to stabilize the blow core.

After the blow core is in place, hot plastic is injected into the parison mold through orifice 8 under action of piston 10 operating in pressure cylinder 9. After injection, the hot plastic surrounds the sleeve 1 under pressure. Due to the intimate contact established thereby between the hot plastic and the exposed surface of the sleeve, the sleeve is rapidly heated until its temperature approaches that of the injected plastic. At that temperature, adhesion of the two materials occurs readily and the material of the sleeve is moreover heated throughout sufficiently to render the sleeve deformable at the same rate as the injected plastic. Accordingly, the sleeve unites with the injected plastic and combines with it to form the composite parison 11.

After the formation of the parison by injection the blow core 5 is removed from the parison mold together with the neck ring 7 and with the parison 11 thereon, as shown in FIG. 3. It is next inserted into the blow mold 12, shown in FIG. 4.

For accurate location of the blow core 5 in the blow mold 12, the blow core may be pressed against the bottom of the blow mold, with the sleeve bottom 3 therebetween. Thus, the blow core is maintained in alignment in the blow mold, the same as it was in the parison mold. As the next step, pressure fluid, usually compressed air, is admitted into the parison through fluid passages 13 and the parison is expanded into the blow mold 12, to assume the shape of the blow mold cavity 14, as indicated by dotted lines in FIG. 4. Fluid pressure is maintained until the blow article cools sufficiently in contact with the walls of the blow mold 12, to be removed therefrom.

The multilayered, hollow plastic container of the present invention is shown in FIG. 5 removed from the blow mold.

While the foregoing preferred procedure has been found to achieve a highly advantageous container in a simple and expeditious manner, other methods may also suggest themselves to those skilled in the art for obtaining the container of the present invention.

As indicated hereinabove, the container of the present invention, surprisingly, attains resistance to elevated temperatures and also fluid barrier resistance, such as gas barrier resistance, as resistance to oxygen and carbon dioxide, or solvent resistance.

An alternate embodiment of liners is shown in FIG. 6, wherein cup-shaped liners 20 are carried on web 21 joined by undeformed parts of the web 22. Naturally, the liners 20 are separated prior to use in the process of the present invention. If desired, the liners in this form may be conveniently stacked and fed to the blow core one at a time. As shown in FIG. 7, the liner may comprise simply two (2) layers, with layer $a'$ representing the barrier layer and layer $b'$ representing the heat resistant layer.

The present invention also resides in a multilayered plastic sheet material, such as shown in FIG. 1a, having characteristics similar to the aforesaid container. The sheet material may be prepared by any desired method, such as adhesive bonding, bonding the edge portions as by edge welding or adhesive bonding, or by co-extruding. Naturally, the sheet material may be prepared in short lengths or long lengths. If long lengths are provided, the sheet material of the present invention may be conveniently supplied in rolls.

In both the sheet and the container of the present invention, it may be preferred to provide the barrier layer removed slightly from an exposed edge.

The sheet material of the present invention naturally has a wide variety of applications, generally wherever elevated temperature resistance plus barrier resistance are desirable. For example, boiling pouches obviously need elevated temperature resistance and may need barrier resistance in storage. Also, for example, products which are hot filled or pasteurized in the container.

The components of the sheet material are as set forth hereinabove. Thus, it is apparent that a variety of materials may be utilized in both the container and sheet material of the present invention. The barrier material may be a fluid barrier material with temperature resistance properties lower than the temperature resistant component or layer, i.e., at least 50° F. lower. Thus, the temperature resistant layer should maintain its structural integrity at the desired temperature, while the barrier layer becomes fluid at said temperature. Hence, one may select any of a variety of temperature resistant layers depending upon the inner layer and desired properties. For example, one may utilize acetal polymers, polycarbonates, phenoxy resins, polysulfones, polyolefins, polyimines, ionomeric resins, and so forth. The outer layers may be different or the same if desired.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A multilayered, blown, seamless hollow plastic container having an open molded neck and having resistance to elevated temperatures and fluid barrier resistance having an outer pressure molded first portion of a plastic material resistant to temperatures in excess of 175° F. and an inner drawn second portion of a plastic material resistant to temperatures in excess of 175° F., wherein said container has a third drawn portion fluid barrier layer of a thermoplastic material between said first and second portions and in substantial conformity therewith, said barrier layer having a lower temperature resistance than said first and second portions, whereby said barrier layer progressively softens and reforms upon exposure to elevated temperature and subsequent cooling to retain its barrier resistant characteristics.

2. A container according to claim 1 wherein said first and second portions are thermoplastic and have resistance to temperatures in excess of 220° F.

3. A container according to claim 1 wherein said first and second portions are independently selected from the group consisting of polyolefins, polycarbonates, polysulfones, phenoxy resins, polyimines, ionomeric resins and acetal polymers.

4. A container according to claim 1 wherein said third portion barrier layer is selected from the group consisting of polyvinylidene chloride, polyvinyl acetate, acrylonitrile polymers and methacrylonitrile polymers.

5. A container according to claim 1 including an inner fourth portion of a thermoplastic material resistant to temperatures in excess of 175° F. between said first portion and said third portion.

6. A container according to claim 1 wherein said neck is externally threaded.

* * * * *